United States Patent
Kojima et al.

(10) Patent No.: US 10,043,081 B2
(45) Date of Patent: Aug. 7, 2018

(54) IMAGE PROCESSING DEVICE AND IMAGE PROCESSING PROGRAM

(71) Applicant: KABUSHIKI KAISHA TOSHIBA, Tokyo (JP)

(72) Inventors: Yohei Kojima, Kawasaki Kanagawa (JP); Yoshiharu Uetani, Kawasaki Kanagawa (JP)

(73) Assignee: Kabushiki Kaisha Toshiba, tokyo (JP)

( * ) Notice: Subject to any disclaimer, the term of this patent is extended or adjusted under 35 U.S.C. 154(b) by 24 days.

(21) Appl. No.: 15/253,791

(22) Filed: Aug. 31, 2016

(65) Prior Publication Data
US 2017/0262714 A1 Sep. 14, 2017

(30) Foreign Application Priority Data
Mar. 14, 2016 (JP) .................................. 2016-050073

(51) Int. Cl.
| | |
|---|---|
| G06K 9/00 | (2006.01) |
| G06T 7/20 | (2017.01) |
| H04N 7/18 | (2006.01) |
| G06K 9/62 | (2006.01) |
| G06T 7/00 | (2017.01) |

(52) U.S. Cl.
CPC ....... *G06K 9/00805* (2013.01); *G06K 9/6202* (2013.01); *G06K 9/6215* (2013.01); *G06T 7/0079* (2013.01); *G06T 7/202* (2013.01); *G06T 7/2033* (2013.01); *H04N 7/183* (2013.01); *G06T 2207/20021* (2013.01); *G06T 2207/30261* (2013.01)

(58) Field of Classification Search
CPC ............. G06K 9/00805; G06K 9/6202; G06K 9/6215; G06K 2209/21; G06T 7/202; G06T 7/223; G06T 7/2013; G06T 7/2086; H04N 5/144; H04N 5/23251; A61B 2034/2065
USPC .......................................................... 382/103
See application file for complete search history.

(56) References Cited

U.S. PATENT DOCUMENTS

| | | | |
|---|---|---|---|
| 8,131,068 B2* | 3/2012 | Abe ...................... | G06K 9/4652 348/453 |
| 2003/0035051 A1* | 2/2003 | Cho ....................... | G01S 3/7865 348/169 |

(Continued)

FOREIGN PATENT DOCUMENTS

| | | |
|---|---|---|
| JP | 2004145493 A | 5/2004 |
| JP | 2005072726 A | 3/2005 |

(Continued)

*Primary Examiner* — Van D Huynh
(74) *Attorney, Agent, or Firm* — Patterson & Sheridan, LLP

(57) ABSTRACT

An imaging device for tracking moving objects includes an image output device outputting first and second images that include a moving object to be tracked. A memory stores image data from the image output device. An image processing device includes local storage and performs a block matching processing comprising evaluating a first block in the first image, dividing the second image into multiple regions, storing image data for a divided region in the local storage unit, determining similarity of the first block to blocks in each of the divided regions in turn, and then determining the similarity of the first and second images according to results obtained for each of the divided regions.

20 Claims, 16 Drawing Sheets

(56) References Cited

U.S. PATENT DOCUMENTS

| | | | | |
|---|---|---|---|---|
| 2005/0226332 A1* | 10/2005 | Uetani | ............... | H04N 19/51 |
| | | | | 375/240.16 |
| 2006/0092280 A1* | 5/2006 | Kamijo | ............ | G06K 9/00785 |
| | | | | 348/169 |
| 2008/0267452 A1* | 10/2008 | Kondo | ............... | G06K 9/4647 |
| | | | | 382/103 |
| 2009/0226039 A1* | 9/2009 | Kondo | ............... | G06T 7/223 |
| | | | | 382/103 |

FOREIGN PATENT DOCUMENTS

| | | | |
|---|---|---|---|
| JP | 4565273 | B2 | 10/2010 |
| JP | 2013205981 | A | 10/2013 |

* cited by examiner

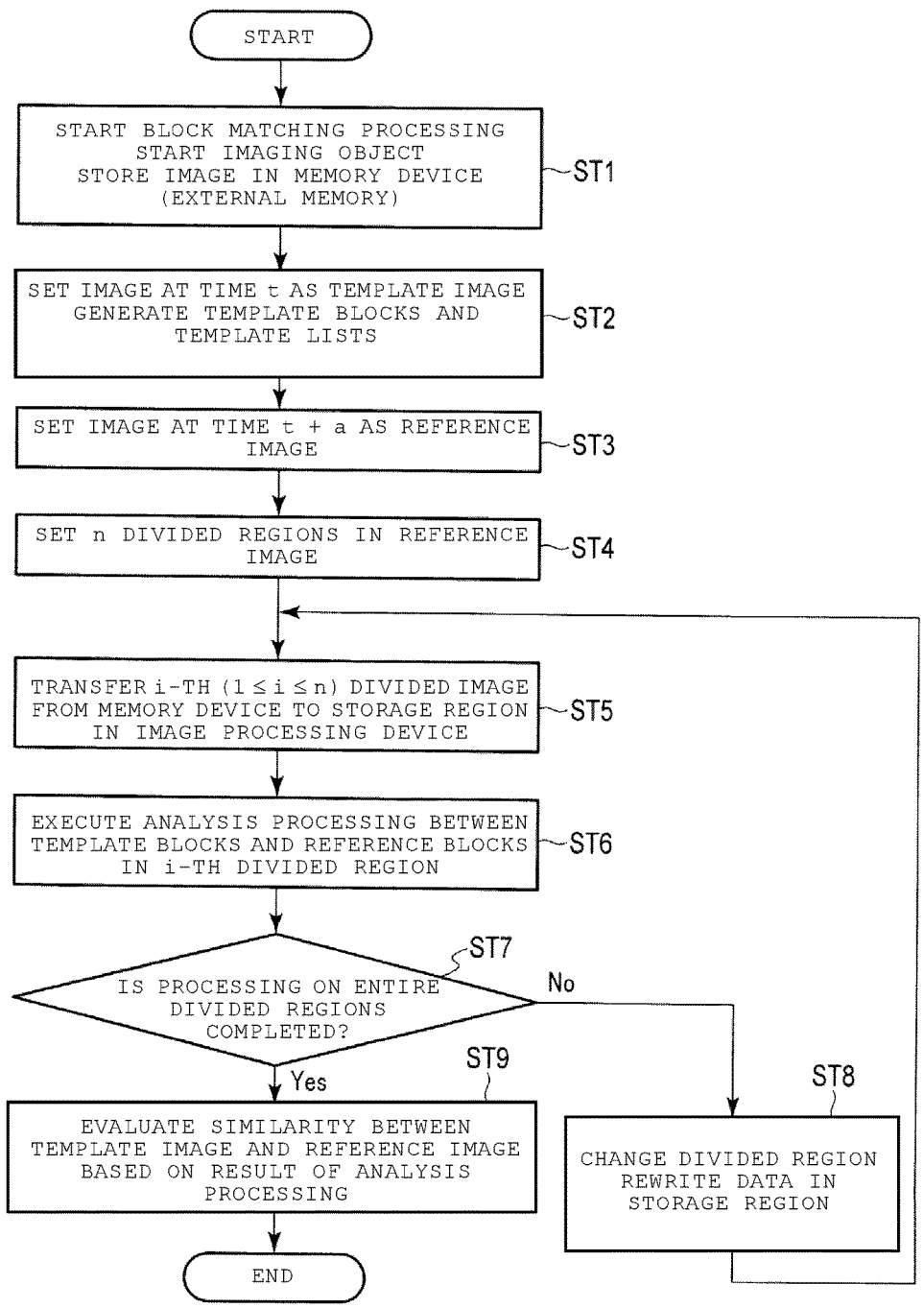

FIG. 8

| TEMPLATE BLOCK ID | MAXIMUM SIMILARITY (INDEX) | SEARCHED BLOCK INDEX |
|---|---|---|
| 1 | 90%(14) | 15 |
| 2 | 0%(0) | 0 |
| 3 | 65%(3) | 10 |
| ⋮ | ⋮ | |

| TEMPLATE BLOCK ID | MAXIMUM SIMILARITY (INDEX) | SEARCHED BLOCK INDEX |
|---|---|---|
| 1 | 90%(14) | 40 |
| 2 | 0%(0) | 0 |
| 3 | 95%(19) | 30 |
| ⋮ | ⋮ | |

⇩

300-3

| TEMPLATE BLOCK ID | MAXIMUM SIMILARITY (INDEX) | SEARCHED BLOCK INDEX |
|---|---|---|
| 1 | 90%(14) | 40 |
| 2 | 95%(22) | 27 |
| 3 | 95%(19) | 35 |
| ⋮ | ⋮ | |

⇩

300-4

| TEMPLATE BLOCK ID | MAXIMUM SIMILARITY (INDEX) | SEARCHED BLOCK INDEX |
|---|---|---|
| 1 | 90%(14) | 40 |
| 2 | 95%(22) | 45 |
| 3 | 95%(19) | 35 |
| ⋮ | ⋮ | |

IMAGE PROCESSING DEVICE AND IMAGE PROCESSING PROGRAM

CROSS-REFERENCE TO RELATED APPLICATION

This application is based upon and claims the benefit of priority from Japanese Patent Application No. 2016-050073, filed Mar. 14, 2016, the entire contents of which are incorporated herein by reference.

FIELD

Embodiments described herein relate generally to an image processing device and an image processing program.

BACKGROUND

In recent years, a technology of recognizing and tracking an observation target in an image has been further studied and developed as an image processing technology.

DESCRIPTION OF THE DRAWINGS

FIG. 6 is a flowchart of an operation of the image processing device according to the first embodiment.

FIG. 8 is a diagram depicting aspects an operation of the image processing device according to the first embodiment.

FIG. 12 is a diagram depicting aspects of an operation of the image processing device according to the first embodiment.

DETAILED DESCRIPTION

Figure 1:
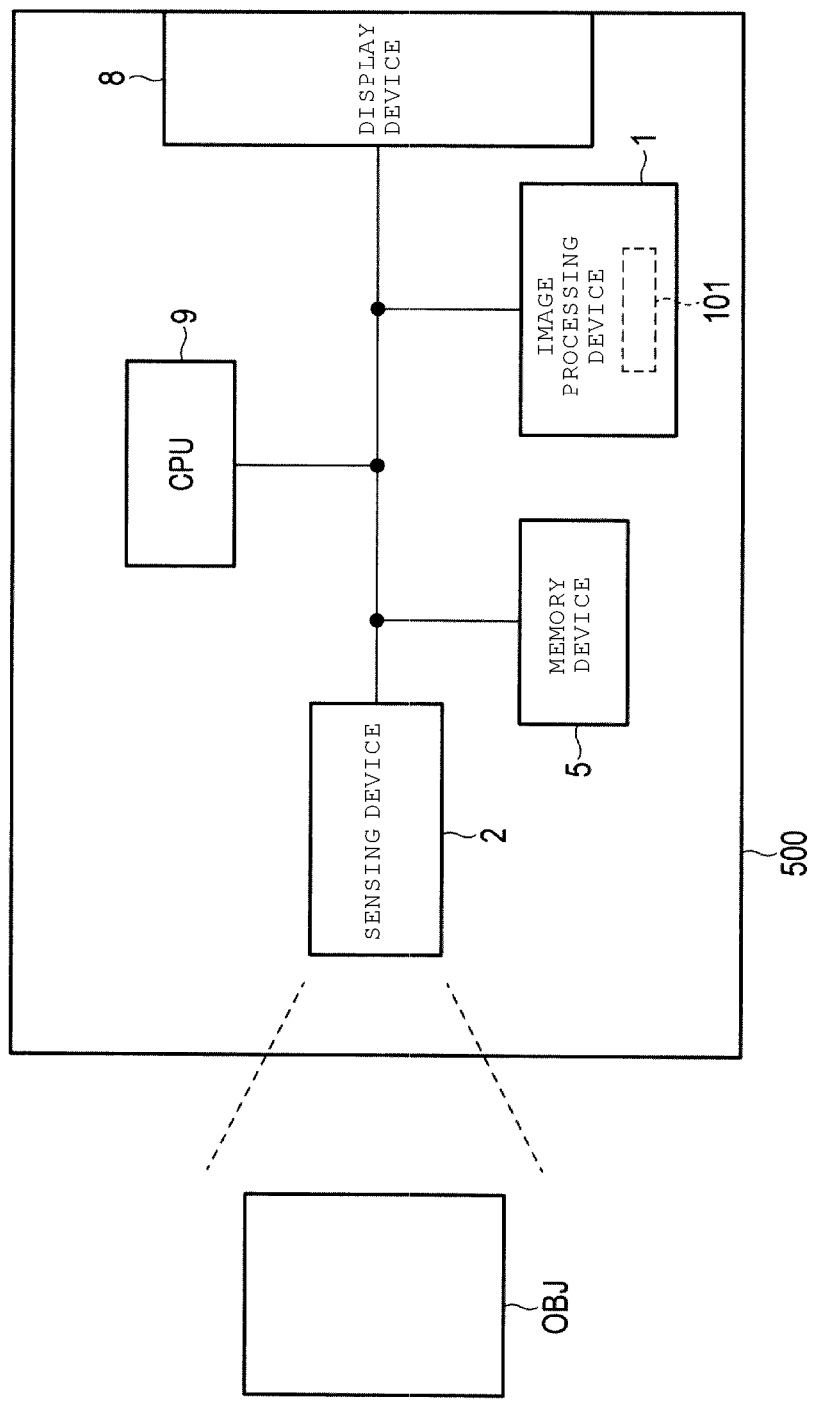
FIG. 1 depicts an example of a device incorporating an image processing device according to a first embodiment.

In general, according to an embodiment, an imaging device for tracking moving objects includes an image output device configured to output image data. The image data includes a first image obtained at a first time and a second image obtained at a second time subsequent to the first time. A memory device is configured to store the image data output by the image output device. An image processing device includes a local storage unit and is configured to perform a block matching processing on the first image and the second image to track an object in the first and second images. The block matching processing comprises: evaluating a feature value of a first image block in the first image and storing the feature value for the first image block in the local storage unit; dividing the second image into a plurality of divided regions; storing image data of a first divided region of the plurality of divided regions in the local storage unit; determining a similarity of the first image block to image blocks in the first divided region and storing results of the similarity determination in the local storage unit; storing image data of a second divided region of the plurality of divided regions in the local storage unit by overwriting the stored image data of the first divided region; determining a similarity of the first image block to image blocks in the image data of the second divided region and storing results of the similarity determination in the local storage unit; and determining similarity of the first image and second image according to results of the similarity determination for each of the plurality of divided regions stored in the local storage unit.

Hereinafter, description will be given of example embodiments with reference to drawings. In the following description, the same reference numerals will be given to elements with the same functions and configurations.

EXAMPLE EMBODIMENTS

(1) First Embodiment

(a) Basic Example

Description will be given of an image processing device according to a first embodiment with reference to FIGS. 1 to 5.

FIG. 1 is an explanatory diagram of a device including the image processing device according to the first embodiment.

As illustrated in FIG. 1, an image processing device (or an image processing system) 1 according to the first embodiment is in an imaging device (or an imaging system) 500.

The imaging device 500 includes the image processing device 1, a sensing device 2, a memory device 5, a display device 8, and a CPU (controller) 9. Other components and/or modules may also be incorporated in the imaging device 500. The imaging device 500 is, for example, a vehicle camera, a security monitoring camera, a digital camera, or a mobile terminal (e.g., smart phone or tablet) with a camera.

The sensing device 2 obtains either a moving image or a stationary image of an object OBJ (an observation target) that is present in an imaging range or imaging field. The sensing device 2 generates data for the moving image or the stationary image as the case may be. Hereinafter, the data of the moving image or the stationary image that has been generated by the sensing device 2 will be referred to as image data.

For example, the sensing device 2 includes an image sensor (camera module). The image sensor forms the image data based on light reflected or emitted from the object OBJ to be imaged. The image sensor includes a plurality of pixels aligned in a matrix shape, for example.

The memory device 5 can store data from the sensing device 2, data from the image processing device 1, and data from the CPU 9 in a volatile or non-volatile manner. The memory device 5 is a Dynamic Random Access Memory (DRAM), for example.

The image processing device 1 can perform various kinds of image processing on the image data output from the sensing device 2 or the image data retrieved from the memory device 5. The image processing device 1 includes a memory region 101 for storing the image data. The memory region 101 is a Static Random Access Memory (SRAM), for example. Memory region 101 may be a portion of a local storage unit included in the image processing device 1. In this context, a "local storage unit" may be a memory module, a memory unit, or a memory device integrated within the image processing device or otherwise dedicated for use with storage operations of the image processing device 1.

The display device 8 can display the image data output from the imaging device, the memory device 5, or the image processing device 1. The display device 8 is a liquid crystal display (LCD) device, for example. The display device 8 may be a touch panel in some embodiments.

The CPU 9 can control operations of the other devices (devices 1, 2, 5, and 8) in imaging device 500.

The devices 1, 2, 5, and 8 and CPU 9 are coupled to each other via a bus, a cable, or wireless communication.

The imaging device 500 may further include a connector that can be connected to a reproduction device or recording device such as optical recording media (CD-ROMs and DVDs, for example) or an external memory (an auxiliary memory device such as a USB memory or a memory card) from which image data can be sent and/or retrieved.

Basic Example of Image Processing

Description will be given of an image processing executed by the image processing device 1 according to the first embodiment with reference to FIGS. 2 and 3.

The imaging device 500 including the image processing device 1 includes a moving object tracking function. To execute the moving object tracking function, the image processing device 1 performs block matching processing.

Figure 2A:
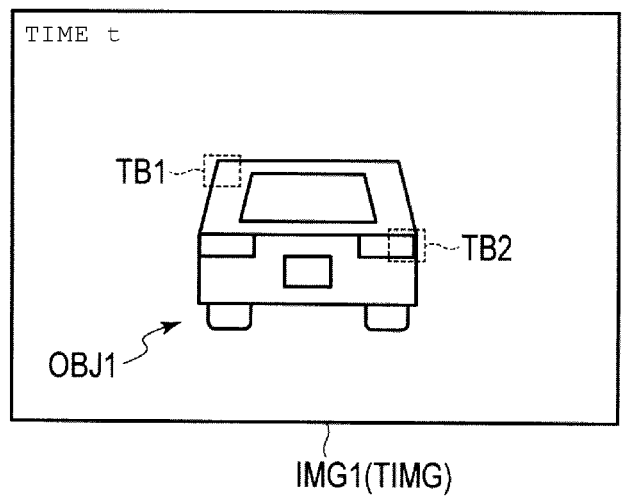
FIGS. 2A and 2B are diagrams for explaining aspects of a process of the image processing device according to the first embodiment.
Figure 2B:
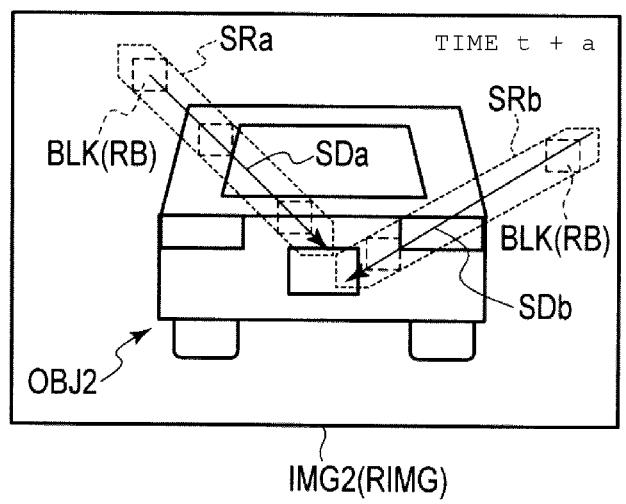

FIGS. 2A and 2B are explanatory diagrams schematically illustrating processing of the image processing device 1 according to the first embodiment.

In the block matching processing, the image processing device 1 uses an image (frame) IMG1 acquired at a time t and an image IMG2 acquired at a different time t+a (which may be the current time, for example) after the time t. The image frames (IMG1 & IMG2) are portions of a moving image (a series of stationary images) obtained by the sensing device 2 over a specific period of time.

The image processing device 1 determines whether or not an object (tracking target) OBJ1 in the image data IMG1 is the same as an object OBJ2 in the image data IMG2.

Hereinafter, the image IMG1 acquired at the imaging time t will be referred to as a "template image TIMG," and the image IMG2 acquired at the imaging time t+a will be referred to as a "reference image RIMG" for clearer description. Data corresponding to the template image TIMG will be referred to as "template image data," and data corresponding to the reference image RIMG will be referred to as "reference image data."

The template image and the data thereof may simply be referred to as a "template image" when distinction between the image and underlying data is not required. Likewise, the reference image and the data thereof will be simply referred to as a "reference image" when distinction is not required.

The images TIMG and RIMG can be considered to include a plurality of blocks TB and RB, respectively. The blocks TB and RB are regions set based on ranges of an x coordinate and a y coordinate in the images TIMG and RIMG. For example, one image frame at FullHD image quality includes several tens of thousands of blocks. One block in the images TIMG and RIMG can be a region (data) corresponding to about 10×10 pixels, for example.

The image processing device 1 extracts specific blocks (hereinafter, referred to as a template block) TB (e.g., TB1, TB2, etc.) from the template image TIMG. The image processing device 1 similarly extracts specific blocks (hereinafter, referred to as a reference block) RB (e.g., RB1, RB2, etc.) from the reference image RIMG.

The image processing device 1 then searches for a block with a high similarity to the template block TB from the blocks RB extracted from reference image RIMG.

The image processing device 1 (or more specifically the CPU 9) calculates feature values for the blocks TB and RB using information obtained from the blocks, such as luminance values and phase information of the blocks TB and RB, for determining a similarity between the images TIMG and RIMG.

The similarity between the blocks TB and RB is a relative index (that is, a value calculated from a difference, a ratio, or the like between blocks from the different frames) based on a result of the comparison between the feature values of the template blocks TB and the corresponding feature values of the reference blocks RB.

For example, the feature values of the blocks TB and RB and the similarity between the blocks TB and RB are obtained by calculating a sum of absolute difference (SAD), zero-mean normalized cross correlation (ZNCC), or the like for the blocks TB and RB. The SAD method calculates a sum of absolute differences between luminance values of two blocks (for example, by summing values for the respective pixels in each block). The ZNCC method calculates a cross correlation coefficient as a statistical value according to a luminance value (density value) distribution in the two blocks in consideration of an average of the luminance values for the respective blocks.

The particular feature values obtained for the blocks TB and RB and the methods of determining similarity between the blocks TB and RB according to the feature values are not particularity limited so as long as the feature values can be calculated from information in the image data for blocks, pixels, or other units processable data in the images TIMG and RIMG. The similarity (or alternatively the difference) between the two blocks may be directly obtained from calculation processing using data corresponding to both the template block TB and the reference block RB.

In general, the image processing device 1 will compare or search several tens to several hundreds of blocks in the reference image RIMG with respect to each template block TB so as to evaluate similarity between the images. For the block search processing, one or more search ranges SR (SRa and SRb) can be set in the reference image RIMG.

The image processing device 1 thus scans the plurality of blocks RB within the search ranges SR in a specific search direction SD (e.g., SDa and SDb).

If the observation target is a moving object (a vehicle, for example), there is a possibility that the size of the object in the image RIMG changes due to a change in the distance between the imaging device and the observation target with time due to a change in the position of the observation target. Therefore, the search ranges SR and the search directions SD in the reference image RIMG are set in oblique directions with respect to the x direction (horizontal axis direction) and the y direction (vertical axis direction) in the image for efficient block matching processing.

The search ranges SR and the search directions (coordinates of start points and end points of the search ranges) SD in the reference image RIMG can be determined by calculation processing performed on the template block(s) TB, such as a feature value(s) of the template block(s) TB. Therefore, the positions of the search ranges SR in the reference image RIMG can change depending on the feature value of the blocks in the template image TIMG and are not required to be fixed beforehand.

The image processing device 1 compares the feature value of the template block TB with the feature value of the reference blocks RB in the search range SR corresponding to the template block TB.

In doing so, the image processing device 1 evaluates whether or not the reference blocks RB in the search range SR are similar to the template block TB.

As a result, the similarity between the object OBJ1 in the template image TIMG and the object OBJ2 in the reference image RIMG is evaluated.

As described above, it is determined whether or not objects in two images are the same by evaluating the similarity between the blocks TB and RB according to the results of the block matching process performed by the image processing device 1.

The imaging device 500 including the image processing device 1 can track the observation target (moving object) in the images based on such a block matching processing.

The image data captured by the sensing device 2 is stored in the DRAM 5. Then, the image processing device 1 uses the reference image RIMG at a certain time increment in the image data for the block matching processing.

Therefore, the reference image RIMG is transferred from the DRAM 5 to the memory region (SRAM) 101 in the image processing device 1.

Here, the image processing device 1 divides the reference image RIMG and stores one of a plurality of regions included in the divided reference image RIMG in the memory region 101 for the block matching processing.

Figure 3A:
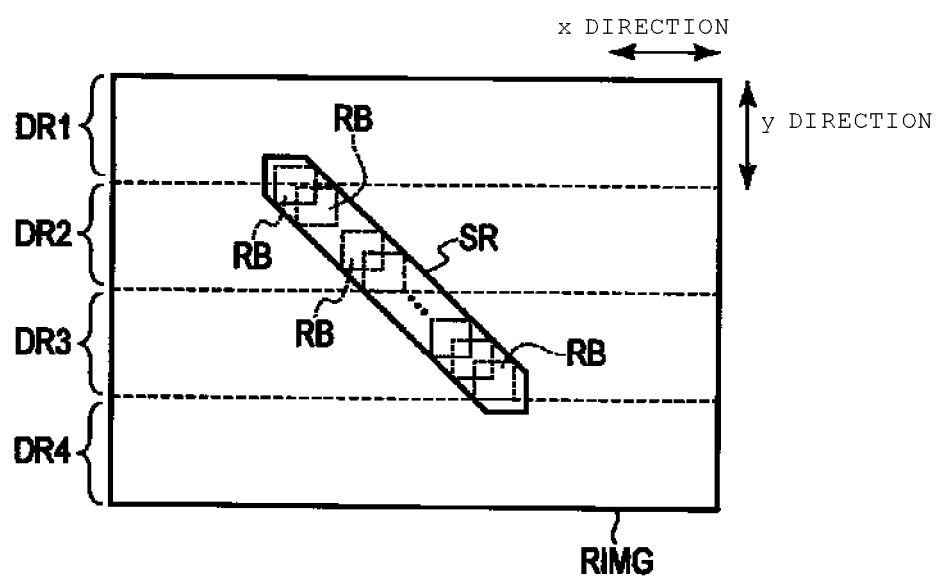
FIGS. 3A and 3B are diagrams depicting aspects of a process of the image processing device according to the first embodiment.
Figure 3B:
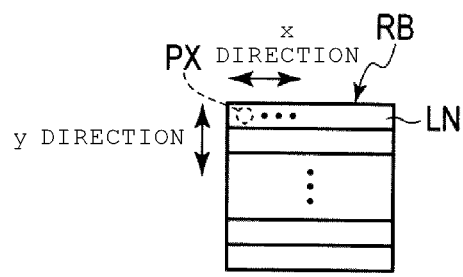

FIGS. 3A and 3B are explanatory diagrams schematically illustrating image processing performed by the image processing device 1 according to the first embodiment.

FIG. 3A illustrates a reference image used by the image processing device 1 according to the first embodiment. FIG. 3B illustrates an image block (RB).

The reference image RIMG is stored in the DRAM 5. When the block matching processing is executed, the image processing device 1 reads the reference image RIMG in the DRAM 5.

As illustrated in FIG. 3A, the image processing device 1 divides the reference image RIMG and then selectively reads one region DR (DR1, DR2, DR3, or DR4) in the reference image RIMG. Hereinafter, the regions DR divided in the reference image RIMG will be referred to as divided regions (or divided images).

In FIG. 3A, the reference image RIMG includes a plurality of divided regions DR divided along the y directions. The respective divided regions DR include a plurality of blocks RB.

The divided regions DR can be data transfer units for the transfer of image data between the DRAM 5 and the image processing device 1. Data for the divided regions DR is stored in the SRAM 101 in the image processing device 1.

If one reference image RIMG is divided into four pieces as data reading units (data transfer units), the one reference image RIGM includes four divided regions (divided images) DR. A range of each divided region DR is set based on a data size of the reference image RIMG, a range of a y coordinate of the reference image (image data), and the like. The number of divided regions set for the reference image RIMG is not limited to four, and the reference image RIMG may be divided into a smaller number of pieces than four (two, for example) or may be divided into a larger number of pieces than four (eight or sixteen, for example).

If the reference image RIMG is divided into n pieces, the data size of each divided region DR corresponds to 1/n (1/4 in this case) of the data size of the reference image RIMG. The divided region DR has a larger data size than one reference block RB (or the template block TB). As an example, each of the plurality of divided regions DR in the reference image RIMG has the same data size. However, data sizes of one or more regions in the plurality of divided regions can be different from the data size of the other regions. That is, not every data region DR is required to be the same size as every other data regions DR.

Here, the regions DR1, DR2, DR3, and DR4 are set as logical regions in the reference image RIMG as described above.

In the first embodiment, the image processing device 1 performs analysis processing (e.g., evaluation of similarity) on each read divided region DR.

Thus, in the analysis processing on the divided region DR1, the image processing device 1 performs the analysis processing on the blocks RB in the search range SR only within the divided region DR1.

After the processing on the divided region DR1 is completed, the image processing device 1 replaces the data of the divided region DR1 in the memory region 101 in the image processing device 1 with data of another divided region DR2 from the memory device 5.

Then, the image processing device 1 performs analysis processing on the blocks RB within the search range SR within the divided region DR2.

In this analysis processing, the data for the search range SR is read from the memory region 101 in units of blocks. As illustrated in FIG. 3B, data transfer of each block RB (data of 10×10 pixels, for example) is executed for each line (1×10 pixels PX) LN in the block RB.

After the processing on the divided region DR2, the image processing device 1 then similarly performs processing of data for the divided regions DR3 and DR4 in sequence.

In this manner, the block matching processing on the entirety of the reference image RIMG is completed.

Here, the reference image RIMG is logically divided, and the data transfer for the block matching processing is executed in units of data corresponding to the divided regions DR. Each selected divided region DR is transferred to the memory region 101 in turn.

As described above, the memory region 101 requires a storage capacity that can store image data corresponding to only one divided region DR.

Therefore, the storage capacity used for storing the reference image in the memory region 101 of the image processing device 1 can be less than would be required to store the entire reference image RIMG at once.

(b) Configuration Example

Description will be given of a configuration example of the image processing device according to the embodiment with reference to FIGS. 4 and 5.

Figure 4:
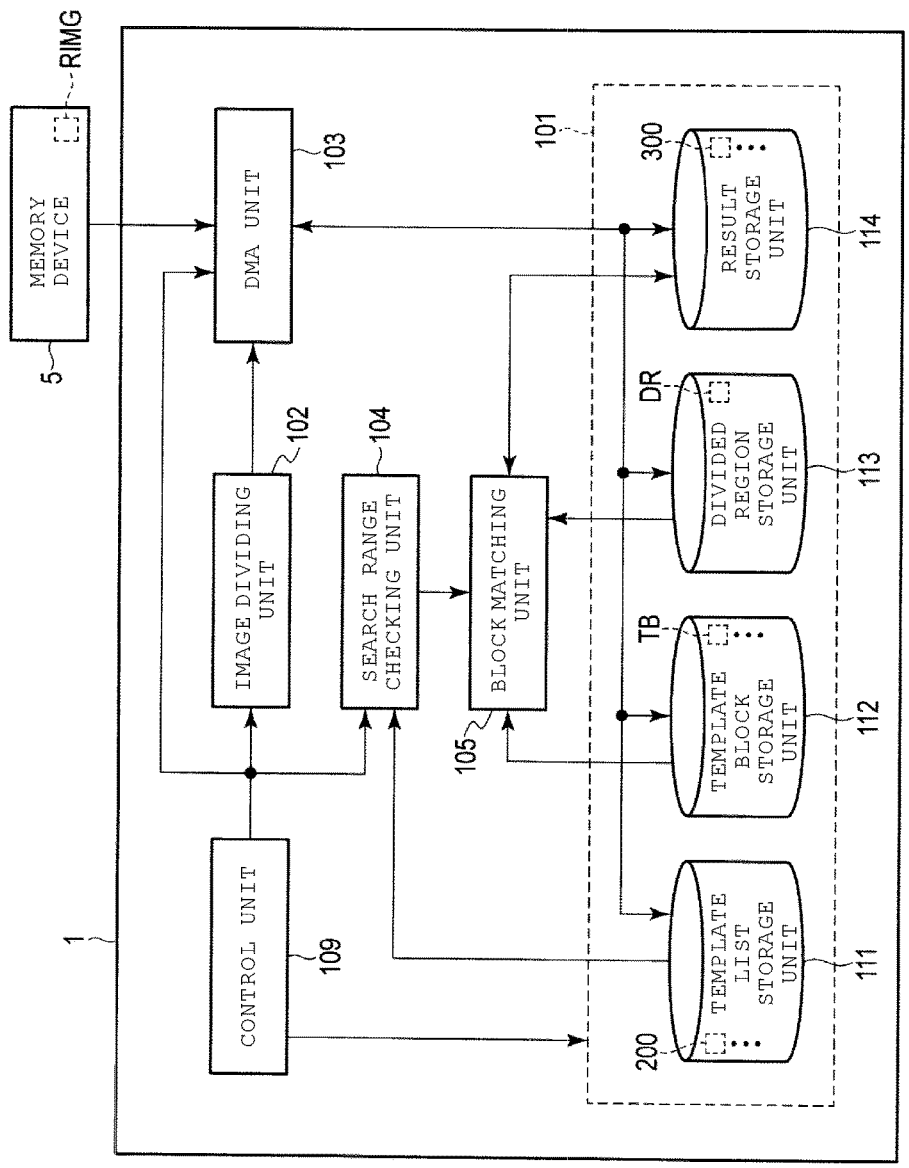
FIG. 4 is a block diagram of the image processing device according to the first embodiment.

FIG. 4 is an explanatory block diagram of an internal configuration of the image processing device according to the first embodiment.

The image processing device 1 according to the first embodiment has a configuration and functions as illustrated in FIG. 4 so as to selectively transfer the plurality of divided regions DR in one reference image RIMG and performing the block matching processing on these divided regions DR.

As illustrated in FIG. 4, the image processing device 1 includes the memory region (hereinafter, also referred to as an internal memory) 101, an image dividing unit 102, a DMA unit 103, a search range checking unit 104, a block matching unit 105, and a control unit 109.

The SRAM 101 as the memory region 101 includes a template list storage unit 111, a template block storage unit 112, a divided region storage unit (divided reference image storage unit) 113, and a result storage unit 114.

The template list storage unit 111 stores one or more lists 200 related to the template image TIMG. Hereinafter, the lists related to the template image will be referred to simply as "template lists."

Figures 5A, 5B:
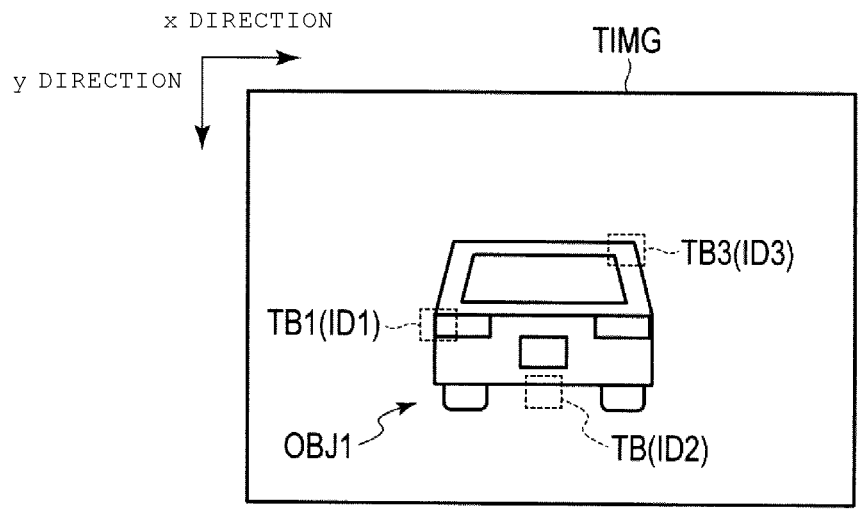
FIGS. 5A and 5B are diagrams depicting aspects of a process of the image processing device according to the first embodiment.

FIGS. 5A and 5B are explanatory diagrams of an example of the template lists used by the image processing device 1 according to the first embodiment.

As illustrated in FIG. 5A, one or more template blocks TB (e.g., TB1, TB2, TB3) are in one template image TIMG. The template blocks TB correspond to specific portions (feature points, for example) of the observation target (tracking target) OBJ1. Identification number IDs (e.g., ID1, ID2, and ID3) are provided to the corresponding template blocks TB. Although three template blocks are illustrated in FIG. 5A for simplification of illustration and description, the number of the template blocks in one template image TIMG is not limited to three.

The template lists 200 are lists (tables) in which various setting conditions (search conditions) for the block matching processing are established.

As illustrated in FIG. 5B, the template lists 200 includes identification numbers of the template blocks TB and coordinates of the template blocks TB within the template image TIMG.

The coordinates of the template blocks TB represents positions in the x direction (x coordinates) and positions in the y direction (y coordinates) in the x-y plane (two-dimensional plane) of the template image TIMG.

The template lists 200 include information about the number of blocks to be searched (referred to as a search number) in the reference image RIMG related to the template block TB and information about the search direction (the start point and the end point of the search range) of the blocks RB in the reference image RIMG related to the template block TB.

The image processing device 1 (or the CPU 9) generates a template list 200 for each template image TIMG. The template list storage unit 111 stores a plurality of template lists 200.

The template block storage unit 112 stores the template blocks TB and various kinds of information (feature values for the template blocks TB, for example) related to the template blocks TB. The feature values of the template blocks may be stored in the template lists 200.

The divided region storage unit 113 stores data for one divided region (divided image) DR in the reference image RIMG during the block matching processing. The storage capacity of the divided region storage unit 113 can thus be smaller than the data size of the entire reference image RIMG. The divided region storage unit 113 is an SRAM, for example.

The result storage unit 114 stores the result (intermediate result) of the analysis processing between the template image TIMG and the divided regions DR and the result (final result) of the block matching. The result storage unit 114 holds a list 300 corresponding to the results of the analysis processing.

The Direct Memory Access (DMA) unit 103 performs data transfer between the memory device (DRAM) 5 and the SRAM 101. The DMA unit 103 directly accesses the DRAM 5 and transfers the data in the DRAM 5 to the SRAM 101. The DMA unit 103 also transfers the data in the SRAM 101 to the DRAM 5.

The image dividing unit 102 sets the number and the size of divided regions in the reference image RIMG in accordance with the total size (e.g., the number of pixels) of the reference image RIMG. The image dividing unit 102 also provides an instruction to the DMA unit 103 for transferring one divided region DR in the reference image RIMG from the DRAM 5 to the divided region storage unit 113 in the SRAM 101.

The search range checking unit 104 reads the template lists 200 in the template list storage unit 111. The search range checking unit 104 refers to the appropriate template list 200 and determines whether or not the search range SR corresponding to a specific template block TB is included in the divided region DR being processed.

The block matching unit 105 executes various analysis processing on blocks RB in the divided region DR based on the search range and the search direction stored in the template lists 200 for the template blocks TB.

The control unit (a processor or a controller) 109 controls operations of the respective circuits (units and sections) 101, 102, 103, 104, and 105 in the image processing device 1.

In the image processing device 1 according to the first embodiment, it is only necessary for the divided region storage unit 113 to have storage capacity capable of holding a data size of one divided region DR. If the reference image RIMG is divided into n pieces, the divided region storage unit 113 requires storage capacity corresponding to 1/n of the data size of the reference image RIMG. If the reference image RIMG with a data size of 2M bytes is divided into four pieces, for example, the storage capacity of the divided region storage unit 113 could be 0.5M bytes.

As described above, it is possible to reduce the storage requirements for the reference image data being processed in the image processing device 1 according to the first embodiment by sub-dividing the reference image data into multiple portions for analysis.

(c) Operation Example

FIG. 6 is an explanatory flowchart of the operation example (control method) of the image processing device 1 according to the first embodiment.

As illustrated in FIG. 6, the image processing device 1 starts the block matching processing when the imaging device 500 executes the moving object tracking function (Step ST1). The imaging device 500 starts to image a specific observation target (tracking target) OBJ that is present in an imaging field of the sensing device (image sensor) 2.

In doing so, image data (moving image data, for example) is generated, and the generated image data is stored in DRAM 5 (memory device 5).

The image processing device 1 or the CPU 9 in the imaging device 500 selects image data captured at time t from among the image data (frames) included in the moving image data as a template image TIMG and processes the template image TIMG (Step ST2).

Here, the control unit 109 (or the CPU 9) performs calculation processing on the template image TIMG.

In doing so, a plurality of blocks TB are extracted from the template image TIMG, and thus one or more template blocks TB are generated.

The block matching unit 105 calculates feature values of the extracted template blocks TB.

The block matching unit 105 (or the control unit 109) stores the template blocks TB and the calculated feature values in the template block storage unit 112.

Here, the block matching unit 105 (or the control unit 109) generates the template lists 200 for the template image TIMG based on the calculation processing performed on the template blocks TB. The block matching unit 105 (or the control unit 109) stores these generated template lists 200 in the template list storage unit 111.

As illustrated in FIGS. 5A and 5B, the template lists 200 include IDs (identification numbers) and coordinates of the respective template blocks TB, and search number and search direction to be used when processing the reference image RIMG.

The calculated feature values of the respective template blocks TB may be listed in the template lists 200.

The image processing device 1 (or the CPU 9) sets image data acquired at the image time t+a (after the time t) as the reference image RIMG for the block matching processing (Step ST3).

Next, the image processing device 1 divides the reference image RIMG into n regions for the block matching processing (Step ST4). In doing so, n (four, for example) divided regions DR are set in the reference image RIMG. Here, "n" is an integer that is equal to or greater than 2.

The specific ranges of the respective divided regions DR can be set based on the data size of the reference image RIMG or the number of pixels (the number of pixels in the y direction, for example) in the reference image RIMG, for example.

The first (i-th) divided region DR in the reference image RIMG is transferred from the DRAM 5 to the image processing device 1 (Step ST5). Here, "i" is an integer that is equal to or greater than one and equal to or less than n.

The image dividing unit 102 and the DMA unit 103 execute the data transfer processing for the divided regions DR in the reference image RIMG in Steps ST4 and ST5.

Here, the image dividing unit 102 designates a range corresponding to 1/n (1/4 in this example) for the data size of the reference image RIMG based on the data size (or the number of pixels in the y direction) of the reference image RIMG. The image dividing unit 102 causes the DMA unit 103 to transfer data corresponding to the first divided region DR1 from among the four divided regions DR in the reference image RIMG from the DRAM 5 to the SRAM 101.

In the image processing device 1, the DMA unit 103 accesses the DRAM 5 and reads data of the range (data size) corresponding to the first divided region DR in the reference image RIMG.

The DMA unit 103 transfers the read divided region DR to the divided region storage unit 113 in the SRAM 101. In doing so, the divided region storage unit 113 stores the selected one divided region DR from among the plurality of divided region DR.

The image processing device 1 executes the analysis processing between the template image TIMG and the divided region DR1 for the block matching processing (Step ST6).

In the image processing device 1, the control unit 109 controls the respective components (circuits, firmware, or software) of the image processing device 1 to execute the analysis processing.

The search range checking unit 104 accesses the template list storage unit 111 and refers to the template lists 200 stored therein.

The search range checking unit 104 determines whether or not a search range related to particular template blocks TB are present in the divided region DR based on the template lists 200. The search range checking unit 104 provides information about the search range in the divided region DR, the search number and the search direction of the reference block RB, and the like to the block matching unit 105 based on the result of checking the search range.

The block matching unit 105 executes various kinds of processing based on the information from the search range checking unit 104.

The block matching unit 105 reads and refers to the template blocks TB and the feature values thereof stored in the template lists 200 in the template block storage unit 112.

The block matching unit 105 reads and refers to the divided region DR in the divided region storage unit 113. The block matching unit 105 scans, in the appropriate search direction, the plurality of reference blocks RB within the search range SR (within the divided region DR) for those template blocks TB which might correspond to the reference blocks RB in the divided region DR based on the information from the search range checking unit 104. The block matching unit 105 sequentially calculates feature values for the reference blocks RB which are scanned in the block matching processing.

The block matching unit 105 compares the feature values of the template blocks TB with the feature values of the reference blocks RB within the search range SR in the divided region DR. In doing so, similarity between the template blocks TB and the reference blocks RB in the divided region DR can be evaluated.

As a result, the block matching unit 105 obtains an analysis result (intermediate result) for the scanned reference blocks RB in the divided region DR in relation to the template blocks TB.

The calculation of the feature values of the template blocks TB and the creation of the template lists 200 may be executed after the reference image RIMG has been transferred to the image processing device 1 so as long as is the calculation occurs before the analysis processing between the template blocks TB and the reference blocks RB.

If the block matching is executed on the divided reference image RIMG, the search range SR in the reference image RIMG with respect to the specific template blocks TB1, TB2, and TB3 may cover a plurality of divided regions DR.

Figure 7:
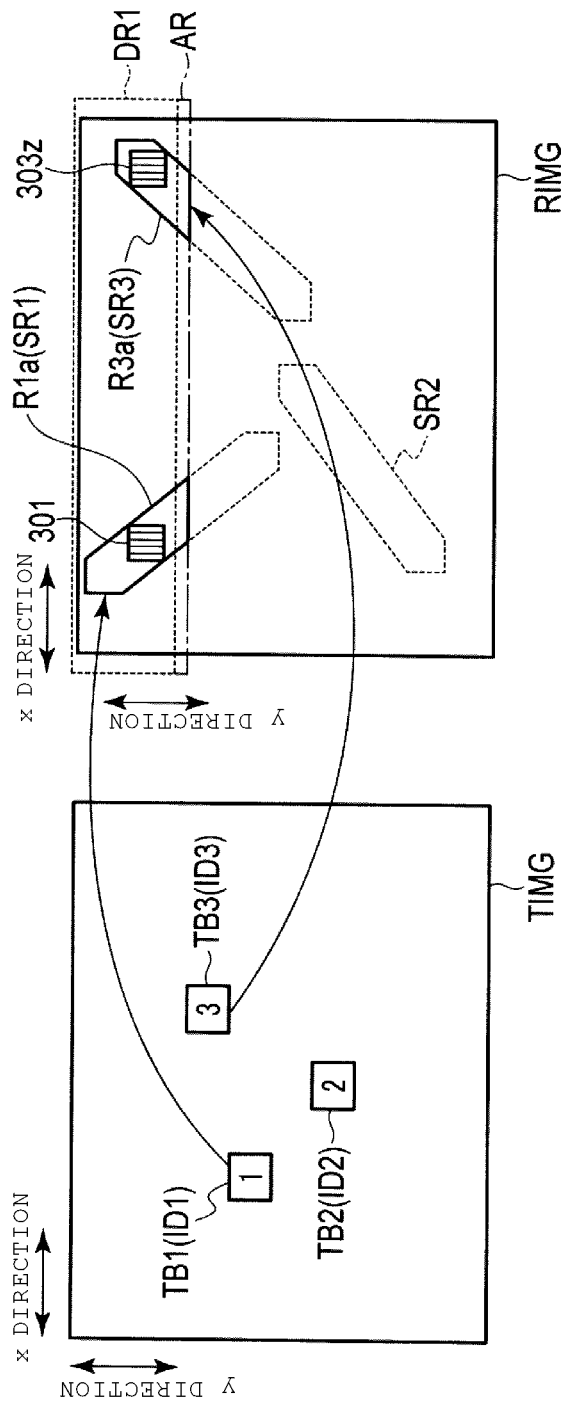
FIG. 7 is a diagram depicting aspects of an operation of the image processing device according to the first embodiment.

FIGS. 7 and 8 are exemplary diagrams schematically illustrating the analysis processing in a specific divided region (here, the first divided region DR1) in the reference image for the block matching processing.

If a plurality of search ranges SR1 and SR3 related to the plurality of template blocks TB1 and TB3 are included in the divided region DR1 as illustrated in FIG. 7, a similarity between the template blocks TB1 and TB3 and the reference blocks RB is analyzed in only in a truncated portion of the full search ranges SR1 and SR3 for the respective template blocks TB1 and TB3. In doing so, blocks 301 and 303z with a high similarity with respect to the template blocks TB1 and TB3 can be detected from among the reference blocks RB in these truncated search ranges R1a (of SR1) and R3a (of SR3) in the divided region DR1. For example, the similarity between the template blocks TB and the reference blocks RB is represented as a percentage obtained from the results of the comparison of the respective blocks (the results of the comparison of the feature values).

The block matching unit 105 stores the processing results for the range R1a (sub-portion of search range SR1) included in the divided region DR1 in the result storage unit 114.

As illustrated in FIG. 8, the largest similarity value (90% in this example) in the processing result and the identification number (index value: "14" in this example) or the address of the reference block (hereinafter, also referred to as a similar block) 301 with the highest similarity in the sub-portion (divided search range) R1a of the search range SR1 for the template block TB1 is written in a result list 300-1. The identification number (index) of the reference block RB is set based on an order in which the reference blocks are scanned or alternatively on the coordinates of the reference block.

The number of blocks in the portion R1a from among total number of reference blocks RB in the search range SR1 is written in the result list 300-1 as the number ("15" in this example) of searched blocks related to the template block TB1 of ID1. As an index value indicating the progress of searching in the search range SR in the divided reference image RIMG, the ID of the final reference block in the portion in the search range in the divided region DR may be used instead of the number of the searched blocks.

In the same manner as the analysis processing and the intermediate result saving processing on the template block TB1, analysis processing related to the template block TB3 of ID3 is executed on the plurality of blocks RB in the portion R3a of the full search range SR3 within the divided region DR1.

In doing so, a reference block 303z with the highest similarity with respect to the template block TB3 is detected from among the plurality of reference blocks RB in the portion R3a. An intermediate result of the analysis processing for the template block TB3 in the portion R3a is written in the result list 300-1.

When the divided regions DR are set in the reference image RIMG, there is a possibility that a data region (a region corresponding to several lines, for example) with a size that is smaller than the notional block size (10×10 pixels, for example) will occur. That is, a template block TB might straddle the dividing line between two adjacent divided regions DR.

In order to avoid the occurrence of analysis processing on such a data region with a size smaller than one block, it is preferable to add a region corresponding to a head portion of one divided region to a terminal portion (boundary portion) of the other divided region at a boundary region of the two adjacent divided regions, that is to have, in essence, the divide regions DR overlap each other somewhat.

For example, a region (hereinafter, referred to as an added region) AR of a head portion (a portion on the side of the region DR1) of the second divided region DR2 in the y direction to a terminal portion (a portion on the side of the region DR2) of the first divided region in the y direction at a boundary portion between the first divided region DR1 and the second divided region DR2. The portion of the second divided region DR2 is added as the added region AR to the first divided region DR1.

The size of the added region AR in the y direction is equal to or less than the size of the reference block RB in the y direction. For example, the size of the added region AR in the y direction corresponds to the size obtained by subtracting the size corresponding to several lines (one line LN, for example) from the data size (the number of pixels) of the reference block RB in the y direction.

The image dividing unit 102 provides, to the DMA unit 103, an instruction for reading the divided region DR based on the data size of the reference image RIMG, adding a region AR corresponding to several lines (a region corresponding to eight to nine lines, for example) continuing from the end of the divided region DR in the y direction to the divided region DR as a margin for the analysis processing, and transferring the region to the divided region storage unit (SRAM for an image) 113 when the divided region DR is read.

The added region AR is a region read by the divided region storage unit 113 from the DRAM 5 (reference image RIMG) for both the analysis processing performed on the first divided region DR1 and for the analysis processing performed on the second divided region DR2.

If the added region AR is added to the divided region DR, the storage capacity of the divided region storage unit 113 is set to storage capacity corresponding to the sum of the data size of the divided region DR plus the data size of the added region AR.

The data of the added region AR is used as a target of analysis for calculating a similarity with respect to the template block TB in the analysis processing performed on the first divided region DR1. The data of the added region AR will also subjected to the analysis processing as data of the second divided region DR2.

An added region AR need not be added to a divided region (the fourth divided region DR4 in this example) that is finally processed from among the plurality of divided regions DR in the reference image RIMG.

The divided region DR1 (the first divided region in the processing) may be regarded as including a portion (region AR) of the next adjacent divided region DR2. In such a case, the divided region DR1 and the divided region DR2 have an overlapping portion. The image dividing unit 102 sets the data size (range) of each divided region DR in consideration of the added region AR and controls reading of the divided regions DR to include the added appropriate region AR.

A margin is thus secured at the boundary portions of the divided regions DR by adding the added region (a portion of the next divided region) AR to the divided region DR as the target of the processing.

Therefore, the analysis processing on a region with a data size that is less than the data size of one block does not occur in the terminal portion (boundary portion) of the divided region DR.

As a result, the image processing device 1 can maintain precision of the analysis processing (the determination of a similarity) between the template blocks TB and the reference blocks RB even when the reference image RIMG is divided into a plurality of regions DR before being subjected to the block matching.

Since the size of the added region AR is less than the total size of each divided region DR, it is not a large burden on the storage capacity of the divided region storage unit 113 to include the added region AR with the divided region DR. That is, storage requirements are still not large even though increased somewhat by the need to store additional data corresponding to the added region AR.

There is also a case where a region with a size that is smaller than one block RB can be regarded as one block for purposes of object tracking functions and the calculation processing for evaluating a similarity can be executed for regions with this smaller size instead of for the larger sized than blocks RB.

After the analysis on the one divided region DR (the first divided region DR1 in this example) and the added region AR is completed, the control unit 109 determines whether or not the analysis processing on the entire divided regions DR in the reference image RIMG (block matching processing) is completed (Step ST7).

The image dividing unit 102 and the control unit 109 can determine whether or not there are any remaining (unprocessed) divided regions DR in the reference image RIMG based on the coordinates of the reference image RIMG and the divided regions DR in the y axis direction, the data sizes of the reference image RIMG and the divided regions DR, the identification numbers applied to the divided regions DR, and the number of times of data transfer, for example.

If there are any divided regions DR on which the analysis processing has not been completed, the control unit 109 provides an instruction for changing the divided region to be processed to the image dividing unit 102 (Step ST8).

The image dividing unit 102 transfers other divided regions DR following the previously processed divided region DR from the DRAM 5 to the divided region storage unit 113 via the DMA unit 103 in the same manner as the aforementioned operations (Step ST5).

In doing so, the image processing device 1 obtains data of second divided region DR2 after the analysis of the first divided region DR1.

The control unit 109 (or the DMA unit 103) rewrites the data of the divided region DR1 in the divided region storage unit 113 with new data of the divided region DR2. The control unit 109 deletes the data of the divided region DR1 in the divided region storage unit 113 and writes the newly obtained data of the divided region DR2 in the divided region storage unit 113. As described above, only the data of the divided region DR2 to be analyzed is stored in the divided region storage unit 113 in the SRAM 101.

The image processing device 1 executes the analysis processing on the divided region DR2 after the processing by the search range checking unit 104 and the block matching unit 105 by substantially the same processing as the processing ST6 described above with reference to FIGS. 7 and 8.

Figure 9:
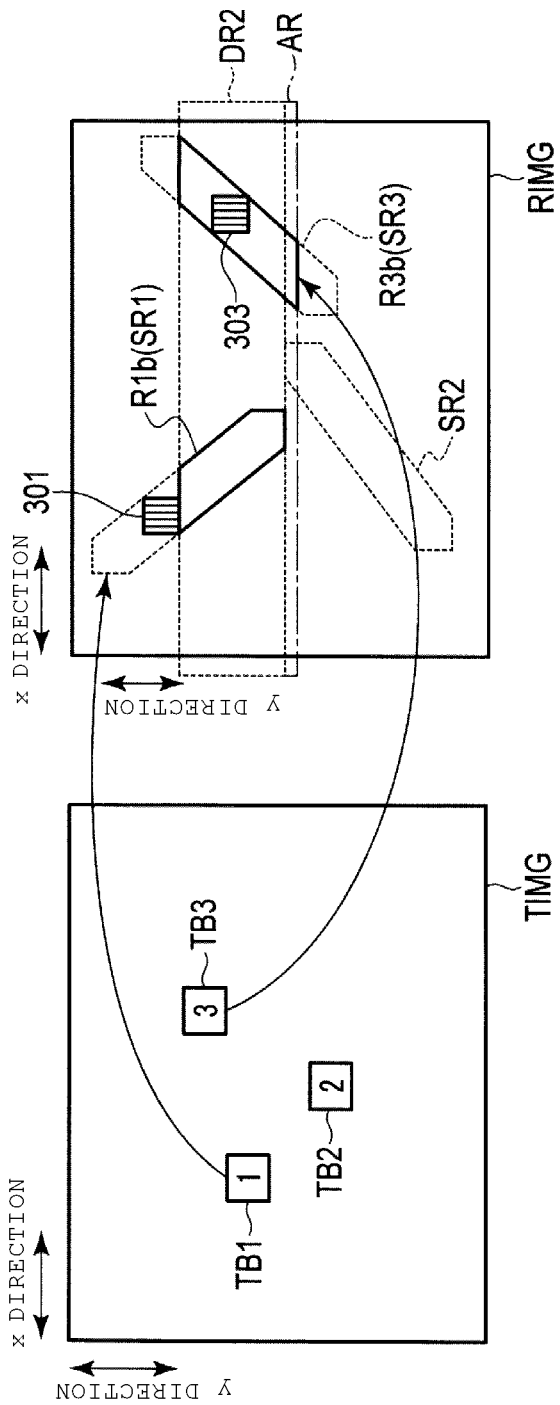
FIG. 9 is a diagram depicting aspects of an operation of the image processing device according to the first embodiment.
Figure 10:
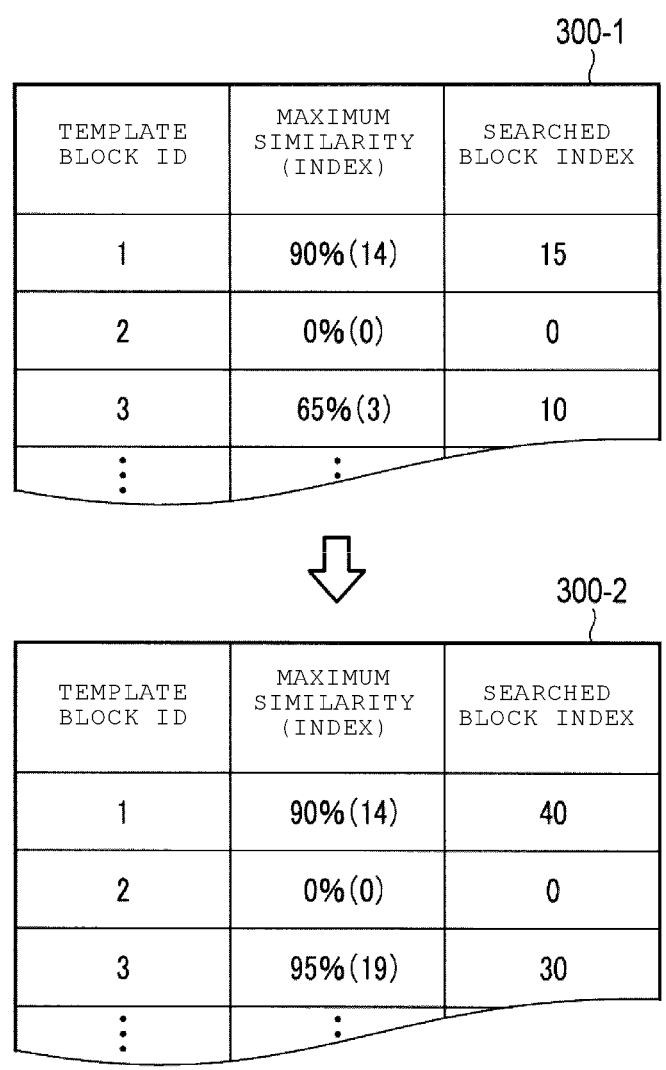
FIG. 10 is a diagram depicting aspects of an operation of the image processing device according to the first embodiment.

FIGS. 9 and 10 are explanatory diagrams schematically illustrating the analysis processing on a specific divided region (the second divided region DR2 in this example) in the reference image for the block matching processing.

The block matching unit 105 accesses the respective storage units 111 and 112 and reads the template lists 200 and the template blocks TB for the analysis processing on the second divided region DR2 (second divided region) based on the result of the checking by the search range checking unit 104. Data corresponding to several lines at the head of the third divided region DR3 (third divided region) is added as the added region AR to the terminal portion of the second divided region DR2.

As illustrated in FIG. 9, the block matching unit 105 calculates feature values of the plurality of reference blocks RB at the portion R1b included in the divided region DR2 in the search region SR1 related to the template block TB1. The block matching unit 105 determines a similarity between the template block TB1 (ID=1) and the plurality of reference blocks RB in the portion R1b. Likewise, a similarity between the template block TB3 (ID=3) and the plurality of reference blocks RB in the portion R3b is determined in the search range SR3 related to the template block TB3 in the divided region DR2.

The block matching unit 105 updates the content of the result lists 300 (300-1 and 300-2) based on the result of the analysis processing on the second divided region DR2.

As illustrated in FIG. 10, the number of searched blocks is updated in the result list 300-2. The number of the reference blocks RB searched in each search range SR in the second divided region DR2 is added to the number of searched blocks from number stored in the list 300-1. If the number of searched blocks is indicated by IDs of the reference blocks, the ID numbers of the searched blocks in the result list 300-2 may be rewritten with the ID number of the reference block RB with the final value at the portion in the search range SR in the divided region DR2.

In doing so, the block matching unit 105 updates number of searched blocks in the corresponding result list 300 (300-2) as illustrated in FIG. 10.

If a block 303 having a higher similarity with respect to the template block TB3 than the reference block 303z in the previously processed divided region DR1 is detected in the reference blocks RB of the divided region DR2 (as is the case in the example analysis processing related to the template block TB3 of ID3), similarity values and an ID (coordinates) of the block having the higher similarity is updated in the intermediate result list 300-2.

If no block has a similarity that exceeds the similarity of the reference block 301 in the processed divided region DR1 in the portion R1b in the search range SR3 in the processed divided region DR2 (as is the case in the analysis result of the divided region DR2 in relation to the template block TB1 of ID1), the maximum similarity related to the template block TB1 is not changed.

After the analysis processing on the second divided region DR2 (and the added region AR), change of the data of the divided region storage unit 113 and the processing on the divided regions after the change are executed by substantially the same processing based on the determination result in Step ST7.

In doing so, the aforementioned processing, the analysis processing, and the updating of the result lists are sequentially executed on the remaining divided regions (the third and fourth divided regions DR3 and DR4 in this example) of the reference image RIMG.

Figure 11:
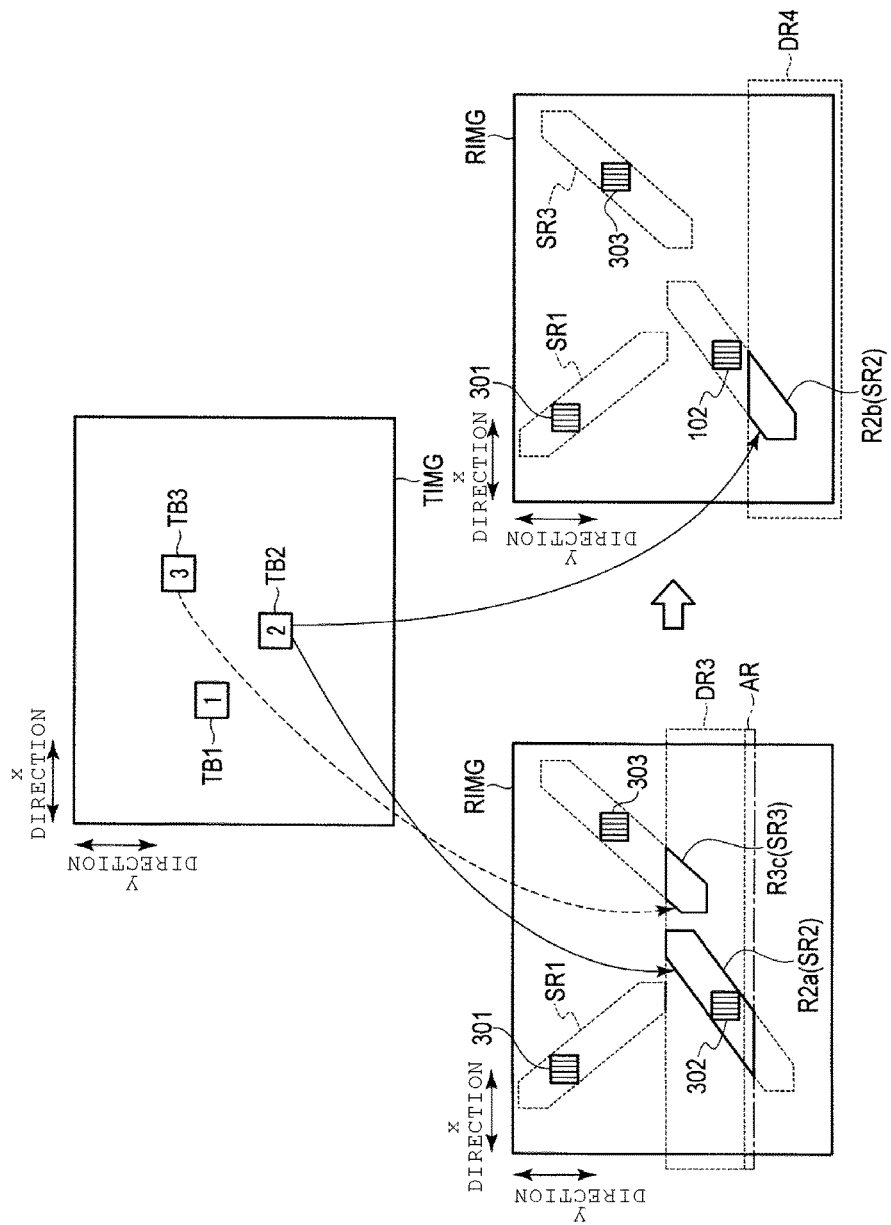
FIG. 11 is a diagram depicting aspects of an operation of the image processing device according to the first embodiment.

FIGS. 11 and 12 are explanatory diagrams schematically illustrating the analysis processing on specific divided regions (the third and fourth divided regions DR3 and DR4 in this example) in the reference image for the block matching processing.

As illustrated in FIGS. 11 and 12, the processing related to the template block TB1, on which the processing of searching for the reference image RIMG has been completed, and further processing associated with template block TB1 is not executed based on reference to the stored search number in the read template lists 200 and the stored number of searched blocks in the result lists 300.

For example, a template block (the template block of ID1 in this example) in relation to which the number of searched blocks in the result lists 300 reached the search number in the template lists 200 and is thus excluded from the processing targets in the course of the further block matching processing on divided regions DR3 and DR4 of the reference image RIMG.

In the analysis processing on the divided region DR3 related to the template block TB3 of ID3, the reference blocks RB at the portion R3c in the search range SR3 are analyzed.

In doing so, values in the result list 300-3 related to the template block TB3 of ID3 are updated in accordance with the analysis result for the blocks at the portion R3c.

In contrast, if the first block belonging to the search range SR2 as the template block TB2 of ID2 is present in the divided region DR3 that newly became a processing target by the replacement of data, the analysis processing on the reference blocks RB in the search range SR2 related to the template block TB2 of ID2 is added as a processing target in the course of the block matching processing on the reference image RIMG.

In doing so, a reference block 302 with the highest similarity with the template block TB2 is detected from the reference blocks RB at the portion R2a in the search range SR2 by the analysis processing on the divided region DR3.

The highest similarity with respect to the template block TB3, the number of the block with the highest similarity, and the number of searched blocks are written in the result list 300-3 based on the result of the analysis on the reference blocks RB at the portion R2a in the search range SR2.

As described above, the result of the analysis processing related to the template block TB2 that became the processing target in the course of the block matching processing is added to the result list 300-3.

The image dividing unit 102 and the control unit 109 rewrite the data of the divided region storage unit 113 with data of the fourth divided region DR4 (fourth divided region) after the analysis processing on the third divided region DR3.

In the analysis processing on the divided region DR4, processing on template blocks (the template block of ID3 in this example) in which no search range is present in the divided region DR4 is not executed.

The analysis processing is executed on the reference blocks RB at the portion R2b in the search range SR2 in the divided region DR4 related to the template block TB2 of ID2.

In doing so, the value in the result list 300-4 related to the template block TB of ID2 is updated in accordance with the result of the analysis on the reference block RB at the portion R2b as illustrated in FIG. 12.

If it is determined that the analysis processing (extraction of blocks having a high similarity) is completed on all the divided regions DR in the one reference image RIMG in Step ST7, the image processing device 1 completes the analysis processing between the template blocks TB and the respective divided regions DR.

The image processing device 1 then evaluates the similarity between the template image TIMG and the reference image RIMG based on the result lists 300.

The image processing device 1 finally transfers the result of similarity evaluation to the CPU 9.

In doing so, the image processing device 1 completes the block matching processing.

For example, the CPU 9 determines whether or not the tracking target OBJ1 in the template image IMG at the clock time t is the same as (similar to) the object OBJ2 in the reference image RIMG at the time t+a based on the result of the block matching processing performed by the image processing device 1.

If the identity (similarity) between the observation targets OBJ1 and OBJ2 in the two images is recognized, the imaging device 500 tracks the moving object in the image field as an observation target.

The image processing device 1 may transfer the result (result lists) 300 of the block matching processing to the CPU 9, and the CPU 9 may execute the determination of the identity of the tracking target OBJ based on the received result lists 300.

As described above, the image processing device according to the first embodiment completes the block matching processing. As a result, the moving object tracking function of the imaging device 500 is realized.

In the above description, an entirety or a part of the processing executed by the image processing device 1 for the block matching processing may be executed by the CPU 9.

(d) Conclusion

According to the image processing devices and the image processing methods of the first embodiment, a reference image is divided into a plurality of regions in the block matching processing. Then, only data in these divided regions are used for the analysis processing and the data of the divided regions can be transferred to a memory region for processing in the image processing device in sequence rather than all at once. Thus, maximum internal image data storage capacity for the image processing device can be reduced.

Therefore, it is only necessary for the storage capacity for storing the reference image data in the image processing device 1 to be storage capacity that can store data with a data size corresponding to a partial region in the reference image.

That is, it is not necessary to provide the storage capacity for storing the entire reference image in the memory region in the image processing device 1.

As a result, the image processing device according to the embodiment can avoid installation of a memory region (e.g., a SRAM for storing an image) with large storage capacity.

Since the image processing device can store the data of a specific region in the reference image according to the embodiment, it is possible to efficiently transfer data in units of blocks in the reference image without executing prefetch on blocks with small data sizes in a non-fixed search range in the reference image.

Therefore, according to the image processing device and the image processing method of the invention, it is possible to enhance data transfer efficiency of the image processing device without causing an increase in costs of the image processing device.

(2) Second Embodiment

Description will be given of an image processing device and an image processing method according to a second embodiment with reference to FIGS. 13 and 14.

As described above, a plurality of template blocks TB are set extracted from one template image TIMG.

If information about the all the plurality of template blocks TB in the specific template image TIMG is referred to and read every time data for a divided region DR is replaced in the block matching processing, the memory band width (data transfer capacity over a specific period of time) requirements for the image processing device 1 increases. In such a case, there is a possibility that data transfer efficiency in the image processing device 1 deteriorates and processing performance will degrade due to the increase in the size of data being transferred within the image processing device 1.

Figure 13:
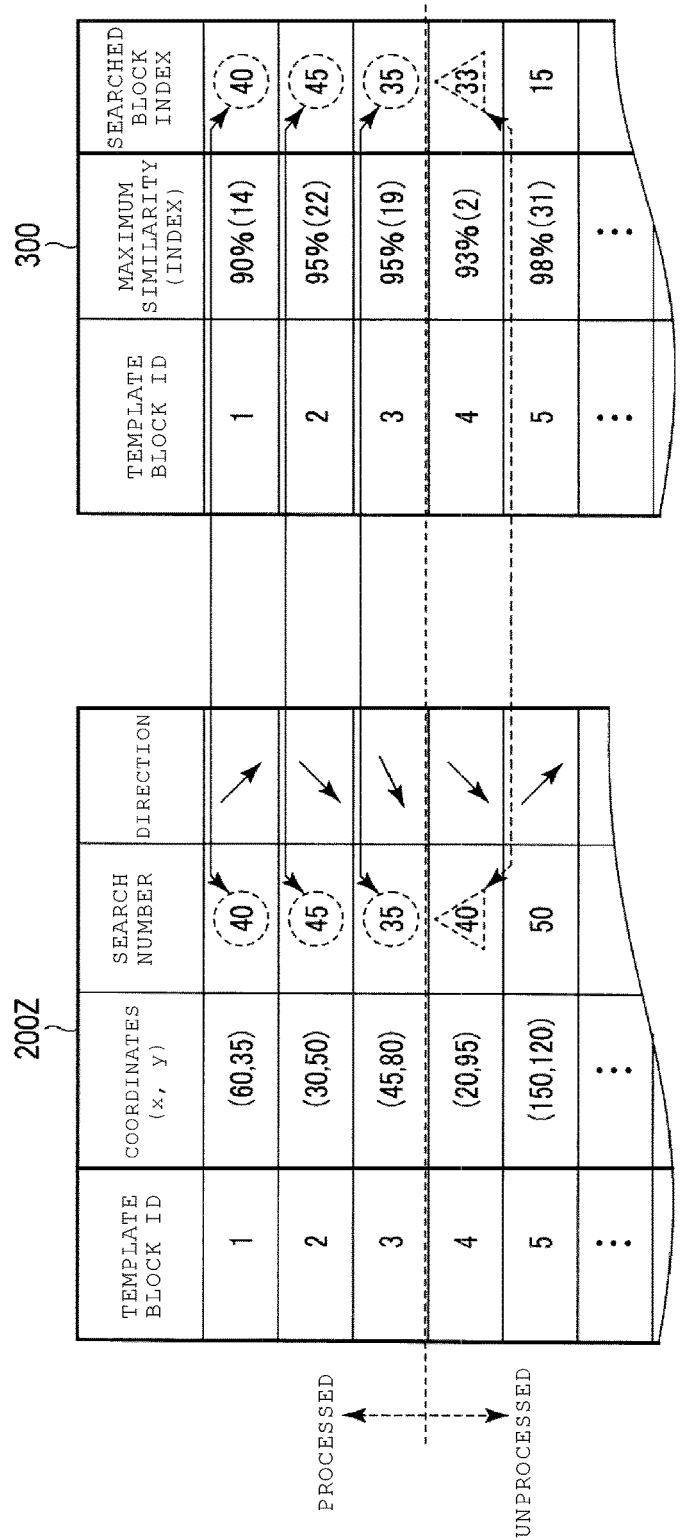
FIG. 13 is a diagram depicting aspects of an image processing device and a processing method according to a second embodiment.

FIG. 13 is an explanatory diagram schematically illustrating aspects of the second embodiment.

As illustrated in FIG. 13, the number (search number) of reference blocks RB to be searched for with respect to each template block TB is stored in a template list 200Z.

The result list 300 stores the number (number of searched blocks) of searched reference blocks RB with respect to each template block TB in accordance with the result of the processing on each divided region DR.

The image processing device can compare the search number and the number of searched blocks to enhance efficiency of the data transfer.

Figure 14:
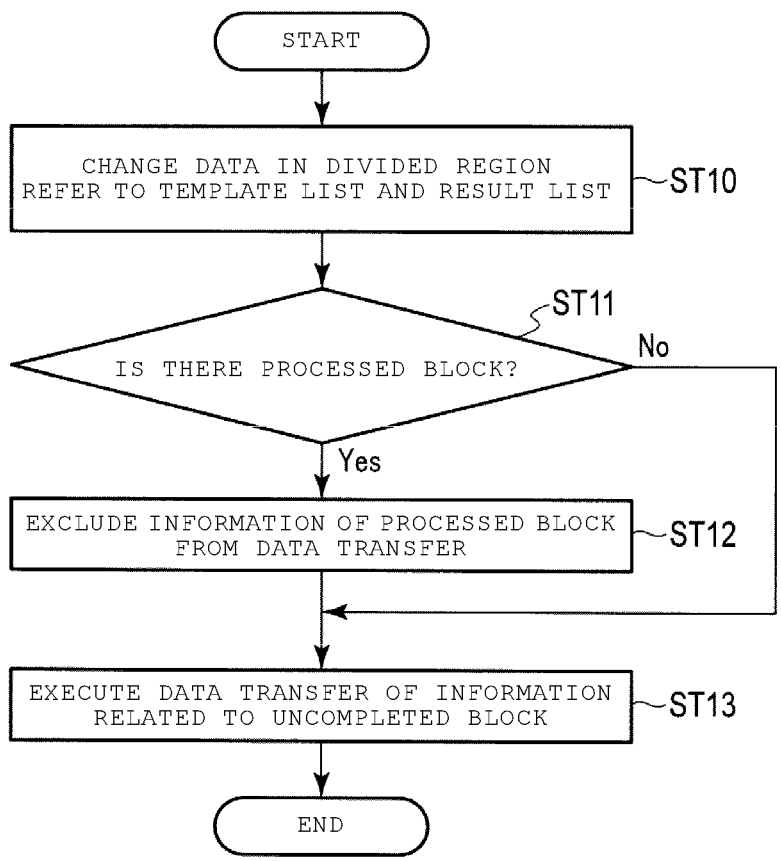
FIG. 14 is a flowchart depicting aspects of the processing method according to the second embodiment.

As illustrated in FIG. 14, only the information related to unsearched template blocks TB is necessary to be transferred and the information related to already searched template blocks TB in the template lists is not necessary to transfer anymore. The status of unsearched and already searched can be determined for each template block TB based on the intermediate results of the processing on the reference image. That is, the "searched block index" value in table 200Z can be compared to the "searched block index" value in table 300 for each template block TB.

FIG. 14 is an explanatory flowchart of operations of the image processing device according to the second embodiment.

For example, the block matching unit 105 (or the control unit 109) of the image processing device 1 refers to the template list 200Z and the result list 300 (Step ST10) when the data of the divided region DR is replaced (Step ST8, in FIG. 6).

The block matching unit 105 compares the search number for each template block TB in the template list 200Z and the number of searched reference blocks RB for each template block TB in the result list 300.

If the search number and the number of searched blocks for each template block TB in the respective lists 200Z and 300 coincide with each other, the block matching unit 105 determines the template block TB, for which the search number and the number of searched block coincide with each other, as a block on which the processing has been completed (referred to as a completed block).

If the search number and the number of searched blocks for each template block in the respective lists 200Z and 300 do not coincide with each other, the block matching unit 105 determines the template block as a block on which the processing has not been completed (referred to as uncompleted block).

The control unit 109 determines whether or not a processed block is present based on the result of the comparison (Step ST11).

The control unit 109 excludes the data (and associated information) for the processed block(s) in the list 200Z from information transferred in the replacement of data for the next divided region DR to be processed (Step ST12).

In doing so, the data related to the processed block is not read from the respective storage units 111 and 112, and internal transfer of the data related to the processed block is not executed.

Data of the uncompleted block (and information related to the uncompleted block) are read for the processing on the next divided region DR in the block matching unit 105.

In doing so, only the data related to the uncompleted block(s) is transferred inside the image processing device 1 (Step ST13).

As illustrated in FIG. 13, the ID numbers of the template blocks TB are preferably set to values in accordance with the value of the y coordinates in the template image TIMG.

For example, the control unit 109 (or the block matching unit 105) applies ID numbers to generated template blocks TB in an order (ascending order, for example) in accordance with the value of the y coordinates when the template block TB is generate (Step ST2).

In doing so, the ID numbers of the template blocks TB are associated with a likely order of the replacement of the data of the divided regions DR.

If a plurality of uncompleted blocks are present, for example, the smallest ID number from among ID numbers of the plurality of uncompleted blocks is checked, and the ID number is marked in the lists 200.

If the ID numbers are applied to the template blocks TB in the order in accordance with the values of the y coordinates, blocks with smaller ID numbers than the smallest ID number from among the ID numbers of the uncompleted blocks are blocks on which the analysis processing for the block matching processing can be considered to have been completed.

Therefore, it is not necessary to transfer data of the template blocks TB (the template blocks of ID1 to ID3 in FIG. 13) with the smaller ID numbers than the smallest ID number from among the ID numbers of the uncompleted blocks and the information thereof in the list 200Z.

The smallest ID number of the uncompleted block ID can be checked and updated every time the data of the divided regions DR is replaced.

According to the second embodiment, it is possible to determine whether to transfer the data and the information of the template blocks by using the ID numbers of the uncompleted blocks for reference as described above.

As described above, the image processing device according to the embodiment can reduce the amount of data transferred inside the image processing device and to reduce the memory band width of the image processing device.

According to the image processing device and the image processing method of the second embodiment, it is possible to enhance efficiency of the data transfer processing.

(3) Third Embodiment

Description will be given of an image processing device and an image processing method according to a third embodiment with reference to FIG. 15.

Figure 15:
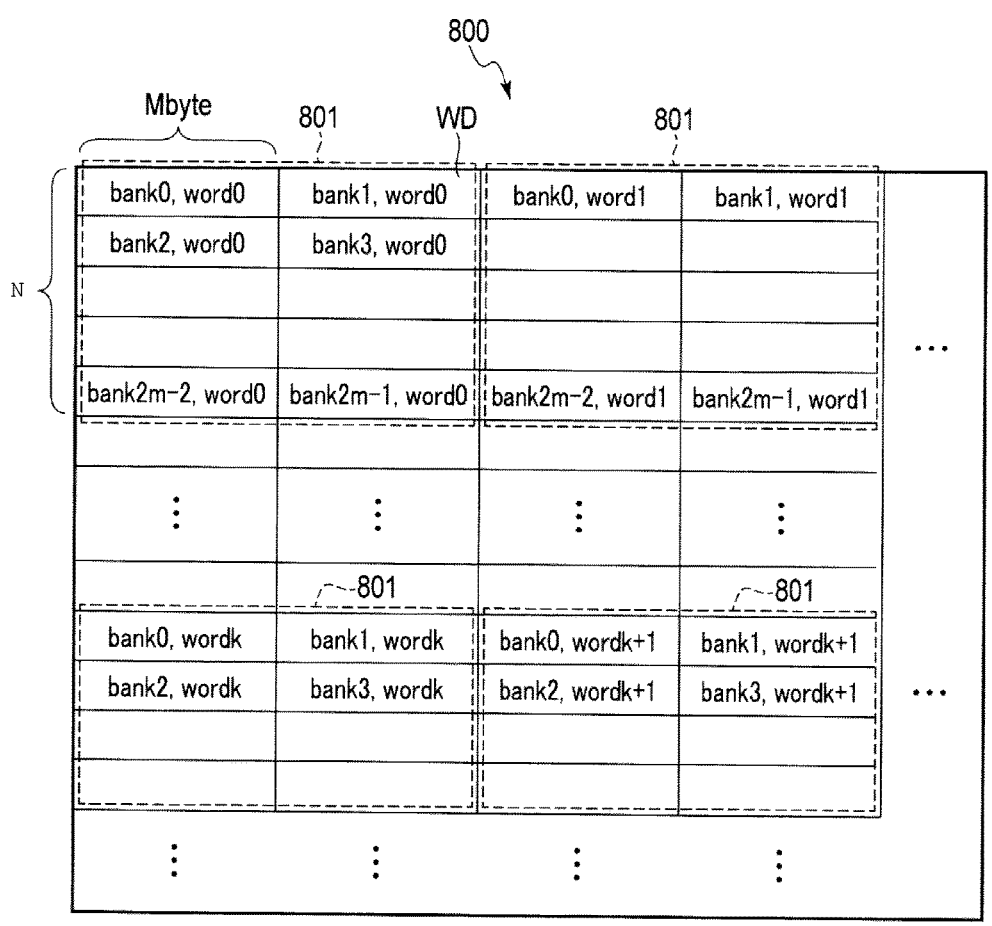
FIG. 15 is a diagram depicting aspects of an image processing device according to a third embodiment.

FIG. 15 is a diagram schematically illustrating an address space of an SRAM in the image processing device 1 according to the third embodiment.

According to the third embodiment, an address space 800 in the SRAM 101 (113) includes a plurality of word regions 801 used for storing image data as illustrated in FIG. 15. The word regions 801 are logical storage regions in which a plurality of words WD with the same word address are aligned in a tile shape (contiguous cells/addresses).

In a specific word region 801, the plurality of words WD respectively have different bank addresses. Banks are regions that can be independently accessed.

In each word region 801, the plurality of words WD are aligned in 2 columns×N (rows).

Words WD with bank address of odd numbers are assigned to one of the two columns, and words WD with bank addresses of even numbers are assigned to the other.

By the plurality of words WD being aligned in the address space 800 as described above, the data in the address space 800 is associated with image data to be stored.

For example, a data size of one word WD is set to "M" bytes. The value "M" for the bytes corresponds to "M" number of pixels.

For example, a unit (block) with a data size of M×N is treated as an access unit for the SRAM 101 (113).

Since the SRAM 101 is accessed in units of blocks for data transfer, the transfer of data with a data size of equal to or less than M×N corresponds to an access to a different bank BK.

Therefore, the number of ports of the memory increases by the address space 800 in the SRAM being set as illustrated in FIG. 15, and physical addresses in the SRAM 101 can be accessed at the same time when the data with the data size of equal to or less than M×N is transferred.

Accordingly, the image processing device according to the third embodiment can perform parallel access to the SRAM in arbitrary units of data with a size of M×N in one data transfer cycle.

Therefore, the image processing device according to the third embodiment can reduce time for data transfer.

(4) Fourth Embodiment

Figure 16:
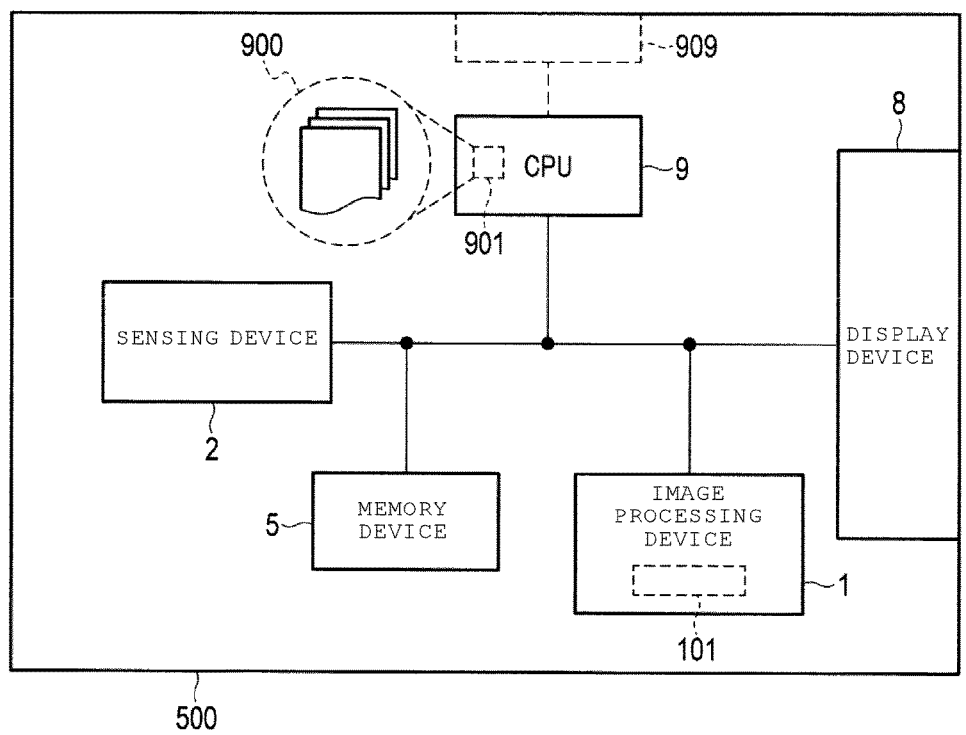
FIG. 16 is a diagram depicting aspects of an image processing device according to a fourth embodiment.

Description will be given of an image processing device and an image processing method according to a fourth embodiment with reference to FIG. 16.

A method (image processing method) of controlling the image processing device described above in the first embodiment may be executed by a program.

A program 900 for causing the image processing device 1 to operate is stored in a recording medium 901 and can be provided to or stored within an imaging device 500. The imaging device 500 can be or incorporate a computer that can read the program 900 from the recording medium 901 using a CPU 9.

For example, the CPU 9 includes as a recording medium (a ROM or a flash memory, for example) a memory 901 that can store the program 900.

The respective steps and processing described above with reference to FIGS. 6 to 14, for example, are described as program codes in the program 900.

The program 900 may be stored in a storage device (a hard disk drive (HDD), for example) outside the CPU 9. The program 900 may be provided to the imaging device 500 via a connector 909 or a reproduction device 909 provided in the imaging device 500. In such a case, the recording medium 901 including the program 900 can be an optical recording medium (a CD-ROM or a DVD, for example), a memory card, a USB memory, or the like.

The fourth embodiment is not limited to a configuration in which an entirety of the program 900 is stored in the memory 901 of the CPU 9, and a part of the program 900 may be stored in the memory 901 at any one time. Alternatively, an entirety or a part of the program 900 of the image processing device 1 may be stored in a memory device 5 in the imaging device 500. An entirety or a part of the program 900 may be stored in the image processing device 1.

The program 900 of the image processing device according to the embodiment may be provided from another device (a server, for example) to the devices 1 and 500 through a cable, the Internet, the Intranet, wireless communication, or the like.

The CPU 9 causes the image processing device 1 to execute the block matching processing including the data transfer in units of divided regions in the reference image RIMG described above with reference to FIGS. 6 to 12 based on the program 900.

If the program 900 is stored in the image processing device 1, the program 900 may directly control the image processing device 1.

The image processing methods according to the second and third embodiments may be provided as programs in recording media.

In doing so, the imaging device 500 and the image processing device 1 can execute image processing such as block matching processing without using an SRAM with large storage capacity as describe above in the respective embodiments.

Even if the image processing methods described above in the respective embodiments are provided and executed as programs as described above, the image processing method according to the embodiment can achieve the same advantages as those in the first to third embodiments.

(5) Others

In the embodiments, the reference image for the block matching includes a plurality of regions divided in the y direction. However, the reference image may include a plurality of regions divided in the x direction. In such a case, the data transfer of the divided regions in the reference image is executed in units of regions divided in the x direction between the memory device (DRAM) and the storage region (SRAM) in the image processing device.

If the imaging device 500 in FIG. 1 that includes the image processing device according to the example embodiments is a vehicle camera, for example, the possibility that collision between a specific observation target and a vehicle provided with the imaging device 500 can be prevented increases by tracking the observation target (another vehicle, for example) by the moving object tracking function using the image processing device according to the embodiment.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. An imaging device for tracking moving objects, comprising:
    an image output device configured to output image data including a first image obtained at a first time and a second image obtained at a second time subsequent to the first time;
    a memory device configured to store the image data output by the image output device; and
    an image processing device including a local storage unit and configured to perform a block matching processing on the first image and the second image to track an object in the first and second images, wherein the block matching processing comprises:
        evaluating a feature value of a first image block in the first image and storing the feature value for the first image block in the local storage unit,
        dividing the second image into a plurality of divided regions;
        storing image data of a first divided region of the plurality of divided regions in the local storage unit;

determining a similarity of the first image block to image blocks in the first divided region and storing results of the similarity determination in the local storage unit;

storing image data of a second divided region of the plurality of divided regions in the local storage unit by overwriting the stored image data of the first divided region;

determining a similarity of the first image block to image blocks in the image data of the second divided region and storing results of the similarity determination in the local storage unit; and determining similarity of the first image and second image according to results of the similarity determination for each of the plurality of divided regions stored in the local storage unit.

2. The imaging device according to claim 1, wherein the local storage unit is a static random access memory (SRAM) module having a storage capacity less than a total data size of the second image.

3. The imaging device according to claim 1, wherein the local storage unit is partitioned to provide:
a first storage unit that stores the image data of one divided region;
a second storage unit that stores coordinate data of the first image block; and
a third storage unit that stores cumulative results of similarity determinations performed on the plurality of divided regions.

4. The imaging device according to claim 1, wherein
the result of the determining of the similarity of the first image block to image blocks in the first divided region includes a first number of image blocks of a search range set for the first image block that were evaluated in the first divided region,
the result of the determining of the similarity of the first image block to image blocks in the second divided region includes a second number of image blocks of the search range that were evaluated in the second divided region, and
the block matching process for the first image block is stopped when a cumulative total of evaluated image blocks equals a total number of image blocks in the search range.

5. The imaging device according to claim 1, wherein the image output device is an image sensing device.

6. The imaging device according to claim 1, wherein the image output device is a camera.

7. The imaging device according to claim 6, wherein the camera is mounted on a vehicle.

8. The imaging device according to claim 1, further comprising:
a processor configured to control the image output device, the memory device, and the image processing device according to a control program stored in the memory device.

9. The imaging device according to claim 1, further comprising:
a display device configured to display image data output from the image output device.

10. The imaging device according to claim 1, wherein the memory device is a dynamic random access memory.

11. An image processing method for tracking moving objects, comprising:
generating a first image block in a first image according to a feature value of the first image block;

determining a similarity of the first image block to image blocks in a plurality of divided regions of a second image obtained at a time after the first image was obtained by:
storing the feature value of the first image block in a local storage unit of an image processing device;
dividing the second image into a plurality of divided regions;
storing image data of a first divided region of the plurality of divided regions in the local storage unit;
comparing the feature value of the first image block to feature values of image blocks in the first divided region to determine similarity, and storing comparison results in the local storage unit;
storing image data of a second divided region of the plurality of divided regions in the local storage unit by overwriting stored image data of the first divided region; and
comparing the feature value of the first image block to feature values of image blocks in the second divided region to determine similarity, and storing comparison results in the local storage unit; and
determining similarity of the first image and second image according to stored comparison results for the plurality of divided regions.

12. The method according to claim 11, wherein the local storage unit is a static random access memory (SRAM) module having a storage capacity less than a total data size of the second image.

13. The method according to claim 11, further comprising:
after determining similarity of the first image and second image according to stored comparison results for the plurality of divided regions, tracking movement of an object depicted in the first and second images based on determined similarity of the first and second images.

14. The method according to claim 11, wherein each divided region in the plurality of divided regions has a same size.

15. The method according to claim 11, wherein at least one divided region in the plurality of divided regions includes a boundary region overlapping with an adjacent divided region in the plurality of divided regions.

16. The method according to claim 11, wherein the feature value for each respective image block is a sum of luminance values of pixels in the respective image block.

17. The method according to claim 11, wherein the local storage unit is partitioned to provide:
a first storage unit that stores the image data of a divided region;
a second storage unit that stores coordinate data of the first image block; and
a third storage unit that stores cumulative results of similarity determinations performed on the plurality of divided regions.

18. An image processing program stored in a non-transitory storage medium that when executed causes an imaging device to execute a block matching processing on image data including a first image obtained at a first time and a second image obtained a second time subsequent to the first time, the block matching processing comprising:
evaluating a feature value of a first image block in the first image and storing the feature value the first image block in a local storage unit of the imaging device;
dividing the second image into a plurality of divided regions;

storing image data of a first divided region of the plurality of divided regions in the local storage unit;

determining a similarity of the first image block to image blocks in the first divided region and storing results of the similarity determination in the local storage unit;

storing image data of a second divided region of the plurality of divided regions in the local storage unit by overwriting the stored image data of the first divided region;

determining a similarity of the first image block to image blocks in the image data of the second divided region and storing results of the similarity determination in the local storage unit; and determining similarity of the first image and second image according to results of the similarity determination for each of the plurality of divided regions stored in the local storage unit.

19. The image processing program according to claim 18, wherein the local storage unit is a static random access memory (SRAM) module having a storage capacity less than a total data size of the second image.

20. The image processing program according to claim 18, wherein the result of the determining of the similarity of the first image block to image blocks in the first divided region includes a first number of image blocks in a search range set for the first image block that were evaluated, the result of the determining of the similarity of the first image block to image blocks in the second divided region includes a second number of image blocks in the search range that were evaluated in the second divided region, and the block matching process for the first image block is stopped when a cumulative total of searched image blocks equals a total number of image blocks in the search range.

* * * * *